(12) United States Patent (10) Patent No.: US 8,292,702 B2
Bolte et al. (45) Date of Patent: Oct. 23, 2012

(54) AUTOMATED FAT TRIMMING SYSTEM

(75) Inventors: Thomas A. Bolte, Columbus, NE (US);
David R. McKenna, Benton, KS (US)

(73) Assignee: Cargill, Incorporated, Wayzata, MN (US)

(*) Notice: Subject to any disclaimer, the term of this patent is extended or adjusted under 35 U.S.C. 154(b) by 0 days.

(21) Appl. No.: 13/114,222

(22) Filed: May 24, 2011

(65) Prior Publication Data

US 2012/0108155 A1 May 3, 2012

Related U.S. Application Data

(60) Provisional application No. 61/349,294, filed on May 28, 2010.

(51) Int. Cl.
*A22C 17/16* (2006.01)
(52) U.S. Cl. ....................................................... 452/134
(58) Field of Classification Search .................. 452/125, 452/127, 130, 134, 136, 149–158, 160, 166, 452/170
See application file for complete search history.

(56) References Cited

U.S. PATENT DOCUMENTS

| 5,372,540 | A  | * | 12/1994 | Burch et al. ................... 452/156 |
| 6,129,625 | A  | * | 10/2000 | Cate et al. ...................... 452/127 |
| 6,547,658 | B2 | * | 4/2003  | Boody et al. ................... 452/171 |
| 6,643,455 | B1 | * | 11/2003 | Malmstrom ....................... 396/4 |
| 6,929,540 | B2 | * | 8/2005  | Johnson et al. ................ 452/134 |
| 6,962,525 | B2 | * | 11/2005 | Tomcak et al. ................ 452/134 |
| 7,621,806 | B2 | * | 11/2009 | Bottemiller et al. .......... 452/150 |
| 7,841,264 | B2 | * | 11/2010 | Kim et al. .......................... 83/13 |
| 7,918,718 | B2 | * | 4/2011  | Christensen et al. .......... 452/157 |
| 8,025,000 | B2 | * | 9/2011  | Kim et al. .......................... 83/13 |

* cited by examiner

*Primary Examiner* — Richard Price, Jr.

(57) ABSTRACT

An automated system and method for trimming fat from an outer surface of a primal of meat includes a conveyor for advancing the meat, an imaging system for creating at least one image of the meat in order to create a fat profile, and a trimming assembly that removes fat from the outer surface of the meat based on the created fat profile. An orientation device is used to secure and guide the meat on the conveyor. In some embodiments, the orientation device is configured to align with a spinal groove in the meat. In some embodiments, the primal of meat is a short loin; in some embodiments, it is a sirloin.

23 Claims, 12 Drawing Sheets

AUTOMATED FAT TRIMMING SYSTEM

CROSS REFERENCE TO RELATED APPLICATION

This application claims the benefit of U.S. provisional application Ser. No. 61/349,294 filed May 28, 2010 entitled Automated Fat Trimming System, which is hereby incorporated by reference in its entirety.

TECHNICAL FIELD

This invention relates to an automated system and method for trimming fat from meat, and more particularly to an automated system and method for trimming fat from an outer surface of a loin.

BACKGROUND

In conventional meat processing operations, loins, such as beef loins, are trimmed to remove a layer of fat that covers the outer surface of the loin. The loins are trimmed to a final customer-defined end point, which may be, for example, about ¼ inch commonly for beef. This trimming operation may commonly be performed manually. Each cut of loin starts with a varied amount of fat cover. Thus the trimming operation is not only labor intensive, but also requires a human assessment of where to remove the fat and how much to remove.

Some equipment may exist that is able to automate the trimming process. However, such equipment likely still requires an operator to assess how much fat needs to be removed from each cut. This cut-specific information is then entered into the automated equipment for each cut. Moreover, such equipment is likely not able to accommodate bone-in products, such as bone-in strip loins and/or bone-in short loins.

SUMMARY

This disclosure is directed to an automated system and method for trimming fat from an outer surface of a primal cut of meat. In one embodiment, a method of removing fat from an outer surface of a primal of meat using an automated system includes directing the primal of meat from a first end of a conveyor of the automated system to a second end of the conveyor, determining where to remove fat from the outer surface, and removing the determined fat from the outer surface of the primal of meat using an automated trimming assembly.

A determination of where to remove fat from the outer surface of the primal of meat may include passing the meat through an imaging system of the automated system to create at least one image of the meat, and creating a fat profile of the meat based on the at least one image. The imaging system may include at least one of X-ray, infrared, camera, video, machine vision, ultrasound, MRI, laser-imaging, thermographic imaging, computerized tomography (CT), and a combination thereof.

In some aspects, removing the determined fat from the outer surface of the meat includes removing fat in a direction parallel to movement of the conveyor. In some aspects, removing the determined fat from the outer surface of the meat includes removing fat in a direction perpendicular to movement of the conveyor.

In another embodiment, a method of removing fat from an outer surface of a loin includes positioning the loin at a first end of an automated system, moving the loin towards a second end of the automated system, determining an amount of fat to be removed from the outer surface of the loin, adjusting at least one operating setting of the automated trimming assembly as a function of the determined amount of fat, and removing the determined amount of fat from the outer surface of the loin using the automated trimming assembly. Determining the amount of fat to be removed from the outer surface may include using an imaging system to gather at least one image of the loin. The automated trimming assembly may include a knife, and an angle of the knife relative to the loin may be adjusted as a function of the determined amount of fat. In some aspects, the loin is a short loin. In some aspects, the loin is a beef loin.

In another embodiment, an automated system for removing fat from an outer surface of a primal of meat comprises an advancement device for moving the primal of meat from a first end to a second end of the automated system, an imaging system for determining a fat profile of the primal of meat, and an automated trimming assembly for removing fat from the outer surface of the primal of meat as a function of the fat profile. In some aspects, the automated system includes a processing device that receives the fat profile from the imaging system and controls the automated trimming assembly as a function of the fat profile. In some aspects, the automated system includes an orientation device for securing the meat in a direction perpendicular to a direction of movement of the advancement device. The orientation device may be a protrusion that engages with a spinal groove on the meat.

In some aspects, the automated system includes a backstop configured to contact a trailing edge of the meat and prevent the meat from traveling in a direction opposite to a direction of movement of the advancement device. In some aspects, the automated system includes a robotic device configured to move the meat relative to at least one knife in the automated trimming assembly. In some aspects, the at least one knife includes an annular rotary blade.

In some aspects, the imaging system of the automated system includes at least one of X-ray, infrared, camera, video, machine vision, ultrasound, MRI, laser-imaging, thermographic imaging, computerized tomography (CT), and a combination thereof.

In another embodiment, an automated system for trimming fat from an outer surface of a loin includes a conveyor configured to move the loin from a first end of the system to a second end, an orientation device configured to align the loin on the conveyor, a trimming assembly configured to trim fat from the outer surface of the loin, an imaging assembly configured to determine a fat profile on the outer surface of the loin, and a processor that receives the fat profile from the imaging assembly and is configured to adjust the trimming assembly as a function of the fat profile.

In some aspects, the trimming assembly includes at least one knife. In some aspects, the at least one knife trims fat in a direction parallel to a direction of movement of the conveyor. In some aspects, the at least one knife trims fat in a direction perpendicular to a direction of movement of the conveyor. In some aspects, the at least one knife is attached to a car. The car may reside on a track that facilitates movement of the car in a direction perpendicular to movement of the conveyor. In some aspects, the at least one knife is attached to a knife body that controls movement of the knife relative to the loin. In some aspects, the at least one knife has freedom of movement relative to the knife body. In some aspects, heat is applied to the at least one knife.

In some aspects, the automated system includes a backstop configured to contact a trailing edge of the loin and prevent the loin from traveling in a direction opposite to a direction of movement of the conveyor. In some aspects, the automated system comprises a support bar configured to contact an underside of the loin and prevent the loin from moving in a direction generally perpendicular to a direction of movement of the conveyor.

In some aspects, the loin is a short loin. In some aspects, the loin is a strip loin. In some aspects, the loin is a beef loin.

In yet another embodiment, a method of removing fat from an outer surface of a primal of meat includes determining a location and an amount of fat to be removed from the outer surface of the meat, activating an automated trimming assembly configured to trim the fat from the outer surface of the meat, and moving the meat relative to the automated trimming assembly such that the trimming assembly removes fat from the outer surface.

In some aspects, determining a location and an amount of fat to be removed from the outer surface is performed by an imaging system. In some aspects, moving the meat is performed by a robotic device. In some aspects, the automated trimming assembly includes at least one knife, which may be essentially stationary during operation of the automated trimming assembly.

DETAILED DESCRIPTION

This disclosure provides for an automated system and method of removing fat from an outer surface of a primal cut of meat. In some embodiments, the primal cut of meat is a loin. In some embodiments, the loin is a beef strip loin. In some embodiments, the loin is a beef short loin. A chine bone or vertebral column of the animal may be used to orient and guide the cut through the automated fat trimming system. An imaging system may be used to determine a fat profile on an outer surface of each meat cut being processed through the trimming system. Because the system is automated, less labor is required for performing the cuts. With the inclusion of an imaging system, it is feasible to account for variability between cuts, and thus the need for human assessment is reduced or eliminated.

As used herein, a "primal cut" refers to a cut of meat that has been separated from the carcass, and is typically further sub-divided or separated into a sub-primal or individual cuts of meat. It is recognized that, as used herein, a primal cut is not limited to a particular cut, unless specifically noted, or a particular type of meat, unless specifically noted. A cut of meat that includes a short loin, a strip loin, and/or a tender loin may be referred to herein as a primal cut; those are some examples of a primal cut.

Figure 1:
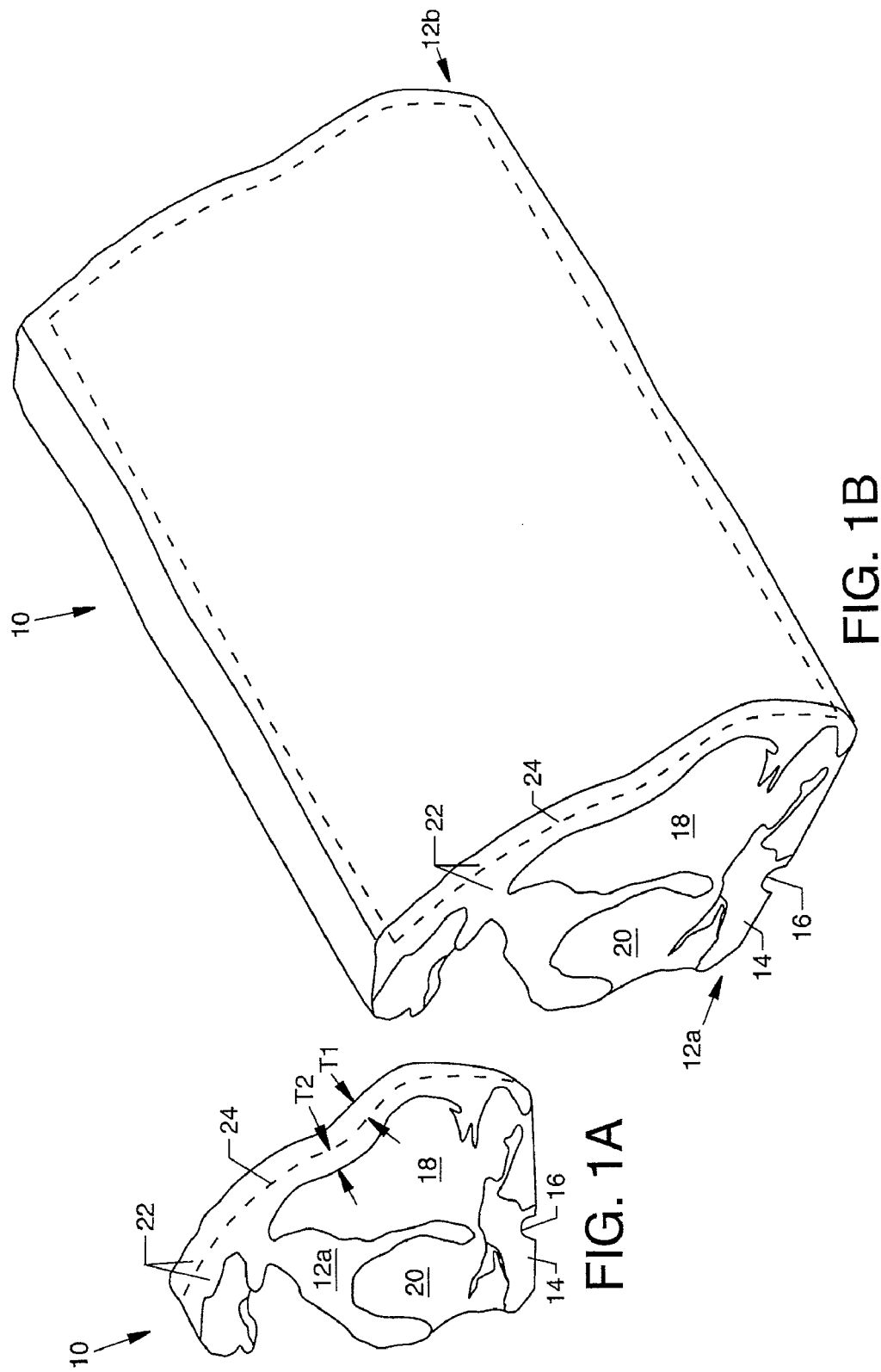
FIG. 1A is an end view of a short loin.
FIG. 1B is a perspective view of the short loin of FIG. 1A.

FIG. 1A is an end view of meat cut 10 taken from sirloin end 12a. Meat cut 10 as shown in FIG. 1A is a beef short loin and includes chine bone 14, spinal groove 16, meat product 18, tenderloin 20, and outer fat 22. Tenderloin 20 may be removed from cut 10 prior to processing cut 10 through the fat trimming system described herein. Alternatively, tenderloin 20 may remain on cut 10. Chine bone 14 is the vertebral column and is typically separated from meat product 18 during later processing. Spinal groove 16 may be used as a guide for orienting cut 10 on the automated fat trimming system described herein. A method and system for removing the chine bone, which also uses the spinal groove and a corresponding protrusion as an orientation device, is described in PCT/US2006/038645.

FIG. 1B is a perspective view of meat cut 10 and includes sirloin end 12a and rib end 12b. Outer fat 22 covers the outer surface of cut 10 essentially from sirloin end 12a to rib end 12b. Commonly a certain amount of outer fat 22 is removed such that the remaining fat portion covering cut 10 has a predetermined thickness. Dashed line 24 represents the end point of outer fat 22 after cut 10 has undergone the fat trimming process described herein. Thickness T1 represents the amount of fat removed and thickness T2 represents the amount of fat remaining on cut 10 after trimming. Thickness T2 may vary, depending, for example, on a specification or customer driven end point. Thickness T2 may commonly be about ¼ inch; however, it is recognized that thickness T2 may be less than ¼ inch or more than ¼ inch. Thickness T1 varies from cut to cut depending on how much fat 22 is originally on cut 10 and depending on predetermined thickness T2.

Before the trimming process, the amount of fat on the outer surface can vary for each cut of meat. Some cuts of meat have a thick layer of outer fat and thus thickness T1 is significant; in contrast, other cuts of meat have a thin layer of outer fat and may require that little fat is removed in order to reach thickness T2. Given the variability from cut to cut, the process to remove a portion of outer fat 22 is labor intensive. Moreover, for a single cut of meat, thickness T1 may vary across the outer surface of the cut; thus T1 may be higher on some areas of the cut relative to other areas of the cut.

Figure 2:
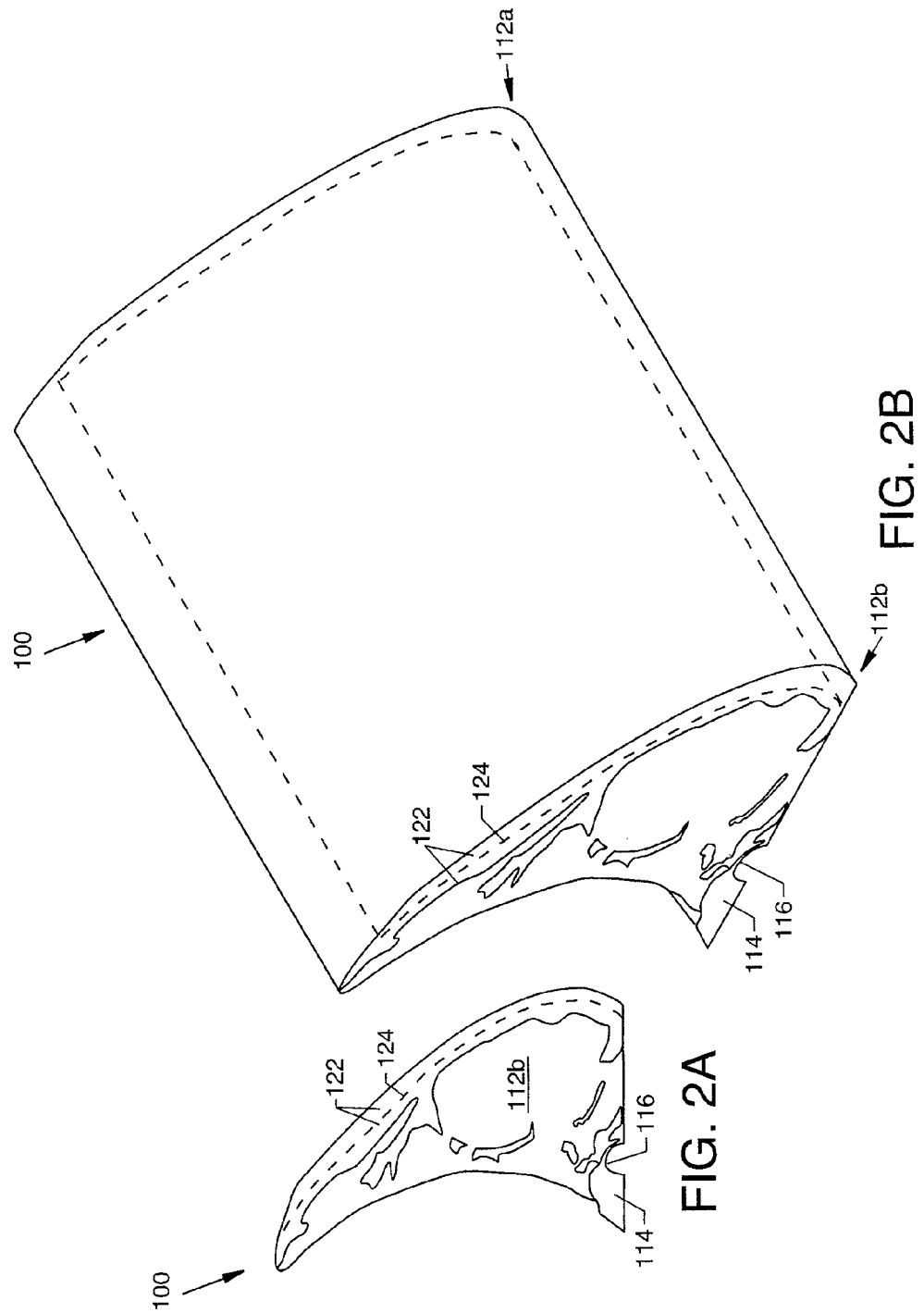
FIG. 2A is an end view of a second short loin.
FIG. 2B is a perspective view of the short loin of FIG. 2A.

FIG. 2A is an end view of meat cut 100, which is another example of a short loin. However, FIG. 2A is taken from rib end 112b. Meat cut 100, similar to cut 10, includes sirloin end 112a, rib end 112b, chine bone 114, spinal groove 116, and outer fat 122. As similarly described above in relation to meat cut 10, a portion of outer fat 122 is removed from cut 100 using the automated fat trimming system described herein. Dashed line 124 represents the end point of outer fat 122 after cut 100 has undergone the trimming process.

Cuts 10 and 100 are both short loins; however the two cuts are mirror images of one another because they are taken from opposite sides of the animal. As described further below, the automated fat trimming system and method described herein is designed to handle cuts from the right and the left side of the animal interchangeably. It is recognized that the automated fat trimming system and method may also be used for a strip loin, which is similar to a short loin with the exception that the tenderloin (see tenderloin 18 of FIGS. 1A and 1B) has been removed. Because the vertebral column is still in-tact for the short loin and the strip loin, both types of cuts may be similarly processed through the automated fat trimming assembly. A full loin, which may or may not include the tenderloin, may also be processed through the same system.

Figure 3:
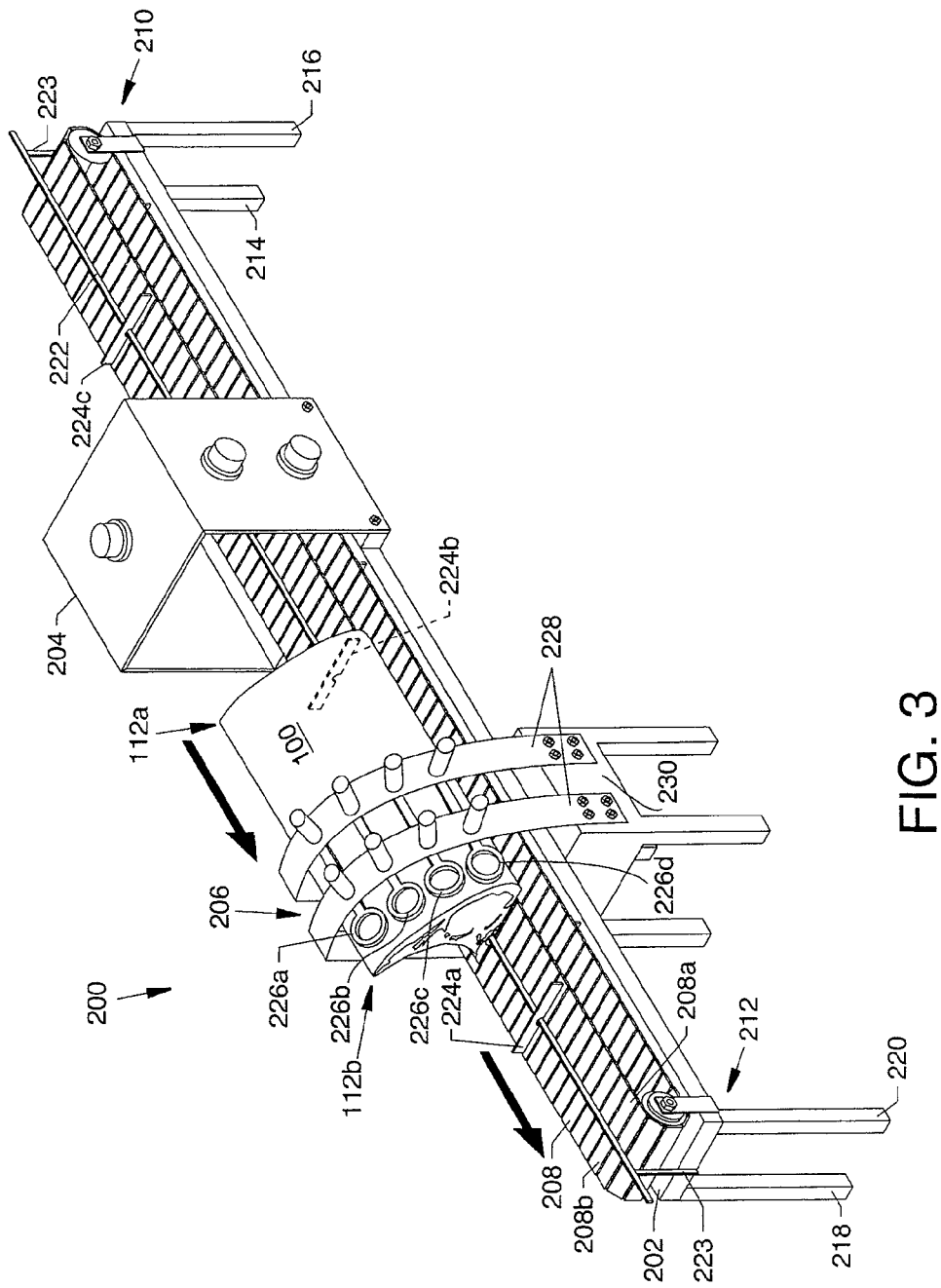
FIG. 3 is a perspective view of an automated fat trimming system, which includes an imaging system and a trimming assembly, for removing fat from the short loin of FIGS. 2A and 2B.

FIG. 3 is a perspective view of automated fat trimming system 200, which includes work surface 202, imaging system 204 and trimming assembly 206. Meat cut 100 of FIGS. 2A and 2B is shown in FIG. 3 undergoing processing through system 200. Work surface 202 is a generally horizontal surface and includes conveyor 208, which is configured to advance meat cut 100 from a first end 210 of system 200 to a second end 212 of system 200. Conveyor 208 is actuated by a power source (not shown) and runs in a continuous loop such that conveyor 208 is able to continuously move from first end 210 to second end 212. It is recognized that a conveyor is just one example of an advancement device that may be used in system 200 for advancing cut 100 from first end 210 to second end 212. Work surface 202 is shown supported by four legs—legs 214 and 216 at first end 210 and legs 218 and 220 at a second end 212. It is recognized that work surface 202 may include more than or less than four legs. Alternatively, work surface 202 could be supported using other designs, such as, for example, a pedestal-style design (not shown).

Work surface 202 also includes spinal channel guide rail 222 which cuts through conveyor 208, thus separating conveyor 208 into sections 208a and 208b. As shown in FIG. 3, spinal channel guide rail 222 is fixed to work surface 202 by support 223; however, it is recognized that other configurations may be used in place of support 223 to position guide rail 222 on conveyor 208. Spinal channel guide rail 222 is configured to engage with spinal groove 116 of meat cut 100. Rail 222 is used as an orientation device to guide meat cut 100 as it moves from first end 210 to second end 212 of conveyor 208, and prevent or limit lateral movement of cut 100 on conveyor 208 (i.e. movement in a direction perpendicular to the direction of movement by conveyor 208). In the embodiment shown in FIG. 3, spinal channel guide rail 222 is stationary and is a protrusion that is sized to mate with spinal groove 116. It is recognized that other features may be used in system 200 to engage with groove 116.

Cut 100 is oriented on work surface 202 such that rib end 112b is a leading edge of cut 100 and sirloin end 112a is a trailing edge of cut 100 as cut 100 moves from first end 210 to second end 212. A corresponding cut from the other half of the animal (see FIGS. 1A and 1B) would be oriented on work surface 202 such that the sirloin end would be the leading edge and the rib end would be the trailing edge. In both configurations, guide rail 222 engages with the spinal groove in the meat cut.

In the embodiment of FIG. 3, conveyor 208 includes a plurality of cleats 224a, 224b and 224c, which may optionally be used to push the meat cuts on conveyor 208. As shown in FIG. 3, cleat 224b is configured to contact a trailing edge (sirloin end 112a) of meat cut 100. Cleat 224b functions as a backstop to prevent cut 100 from moving backward on conveyor 208, or in a direction opposite to the direction of movement by the conveyor. Cleats 224 may be important as some meat cuts are slippery and may not easily grip to conveyor 208. It is recognized that other features, such as panels on conveyor 208, may be used, in the alternative or in addition to cleats 224, to push meat cut 100.

Imaging system 204 of system 200 is used to create a fat profile of outer fat 122 on cut 100. The fat profile is then used by trimming assembly 206 to determine where to remove fat on cut 100 and how much fat to remove. Imaging system 204 may include any type of imaging module, including, but not limited to, X-ray, infrared, camera, video, machine vision, ultrasound, MRI, laser-imaging, thermo-graphic imaging, and computerized tomography (CT). The details of imaging system 204 are not focused on herein. However, to give a few examples of how it may work, imaging system 204 may be used to create a 3D profile of cut 100, including a 3D profile of outer fat 122. In those embodiments, it is possible to understand differences in the thickness of fat 22 across cut 100. In some embodiments, imaging system 204 may be configured such that an image is created of meat cut 100 near a leading edge of cut 100 and near a trailing edge of cut 100; the two images may then be used to extrapolate a fat profile across cut 100. The images may be created, for example, using a camera or a laser. In some embodiments, a combination of the imaging models listed above may be used.

Based on the fat profile created through the use of imaging system 204, trimming assembly 206 removes the appropriate amount of fat from cut 100. In some embodiments, trimming assembly 206 is configured to be automated and includes a plurality of trim knives 226 (226a, 226b, 226c, 226d), trim knife support frame 228 and trim knife support table 230. As meat cut 100 travels from first end 210 of conveyor 208 to second end 212, trimming assembly 206 is configured to remove or trim a portion of outer fat 122 of cut 100. Trim knives 226 of trimming assembly 206 are oriented in parallel to the direction of movement of cut 100 on conveyor 208. Thus, as cut 100 passes through trimming assembly 206, each of knives 226 removes fat from the outer surface of cut 100.

Figure 4:
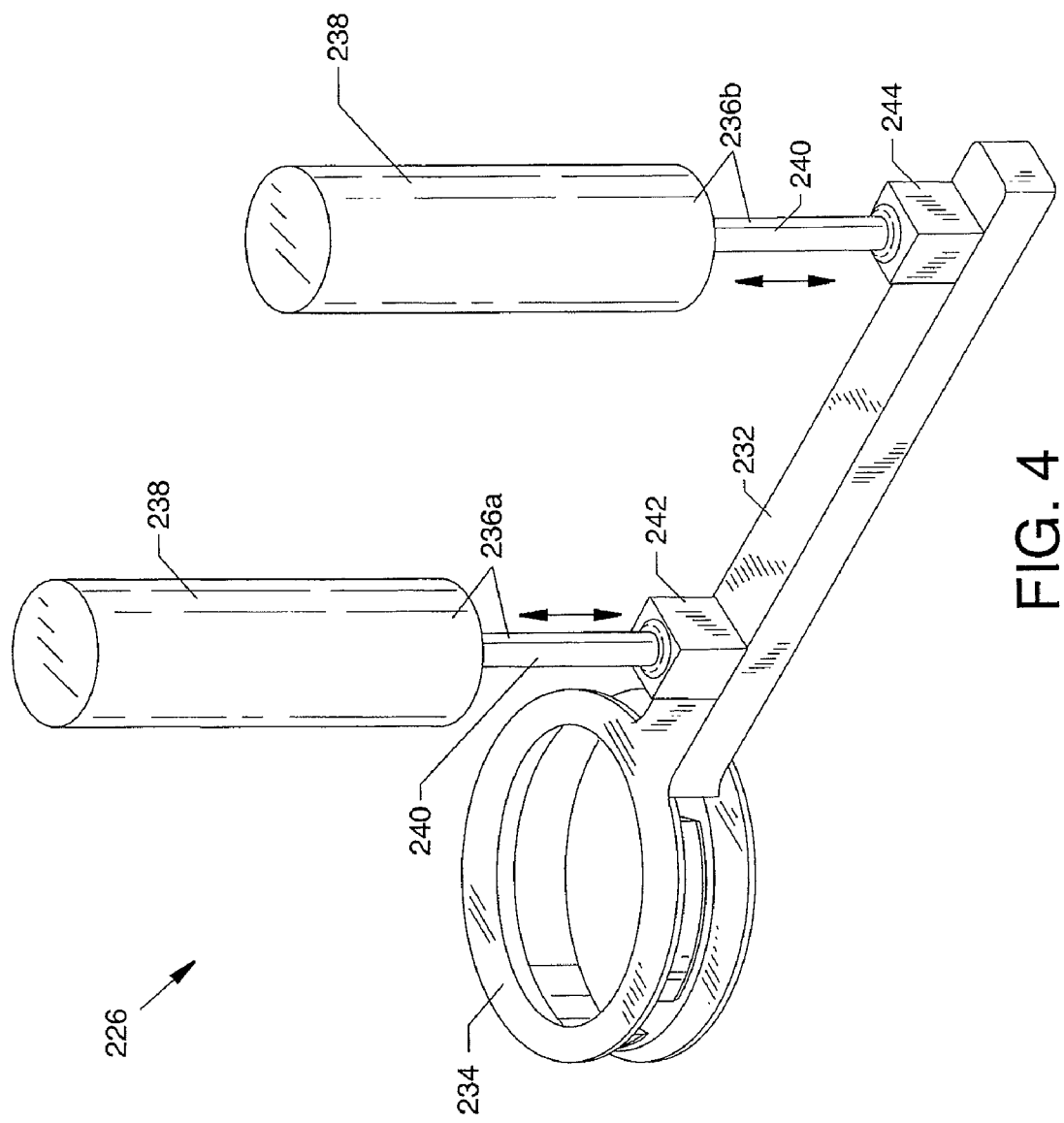
FIG. 4 is a perspective view of one of the trim knives included in the trimming assembly of FIG. 3.

FIG. 4 is a perspective view of one of trim knives 226 from FIG. 3 in which trim knife 226 has been disassembled from trimming assembly 206 to better describe the features of trim knife 226. Trim knife 226 includes knife body 232, blade assembly 234, first knife actuator 236a, and second knife actuator 236b. In one embodiment, blade assembly 234 includes an annular rotary blade that contacts and cuts the fat on the outer surface of the meat. An example of blade assembly 234 is Whizard Modular Trimmer from BETTCHER Industries, Inc. Knife actuators 236a and 236b are configured to attach trim knife 226 to support frame 228. Each knife actuator 236a and 236b includes fixed portion 238 and adjustable portion 240. First attachment 242 is used to attach first knife actuator 236a to trim knife body 232; second attachment 244 is used to attach second knife actuator 236b to trim knife body 232. First and second attachments 242 and 244 are described in further detail below.

Adjustable portions 240 of actuators 236a and 236b are configured to retract inside fixed portion 238 in order to adjust the length between trim knife body 232 and fixed portion 238. A control mechanism for adjustable portion 240 may include, but is not limited to, pneumatic control, hydraulic control, or an electric-servo motor. As better illustrated in FIGS. 5 and 6, adjustable portions 240 of actuators 236a and 236b are used to control the distance between trim knife body 232 and the meat cut, and consequently the distance between blade assembly 234 and the meat cut. Fixed portion 238 is removable from adjustable portion 240 and the rest of trim knife 226 such that trim knife 226 can be attached to support frame 228 (see FIGS. 3 and 5). Although not shown in the figures, trim knife 226 may be attached to support frame 228 through known attachment means, including, for example, a nut and washer assembly.

As stated above, adjustments to adjustable portions 240 change the distance between knife body 232 and the meat cut. First attachment 242 and second attachment 244 may be pivot assemblies, which allow for pivotal movement of knife body 232. In the embodiment shown in FIG. 4, first attachment 242 and second attachment 244 both have a ball and socket configuration. As such, knife body 232 is able to have two degrees of freedom of movement at both attachment points on knife body 232. In some embodiments, second attachment 244 may have restricted movement such that a back portion of knife body 232 has limited range of motion. In the configuration shown in FIG. 4, blade assembly 234 is attached or connected to knife body 232 in such a way that blade assembly 234 has some freedom of movement related to knife body 232. As such, blade 234 may be able to float on cut 100 as cut 100 moves on conveyor 208. In that case, blade 234 is well configured to follow the unique contours of each cut of meat that passes through trimming assembly 206. Although a ball and socket configuration is used in the embodiment shown in FIG. 4, it is recognized that other mechanical apparatus that would allow for two dimensional movement of knife body 232 may be used. For example, a compound hinge may be used to provide two axes of movement for knife body 232. In some embodiments, knife 226 may be configured such that knife body 232 only has movement in one direction or around one axis.

Figure 5:
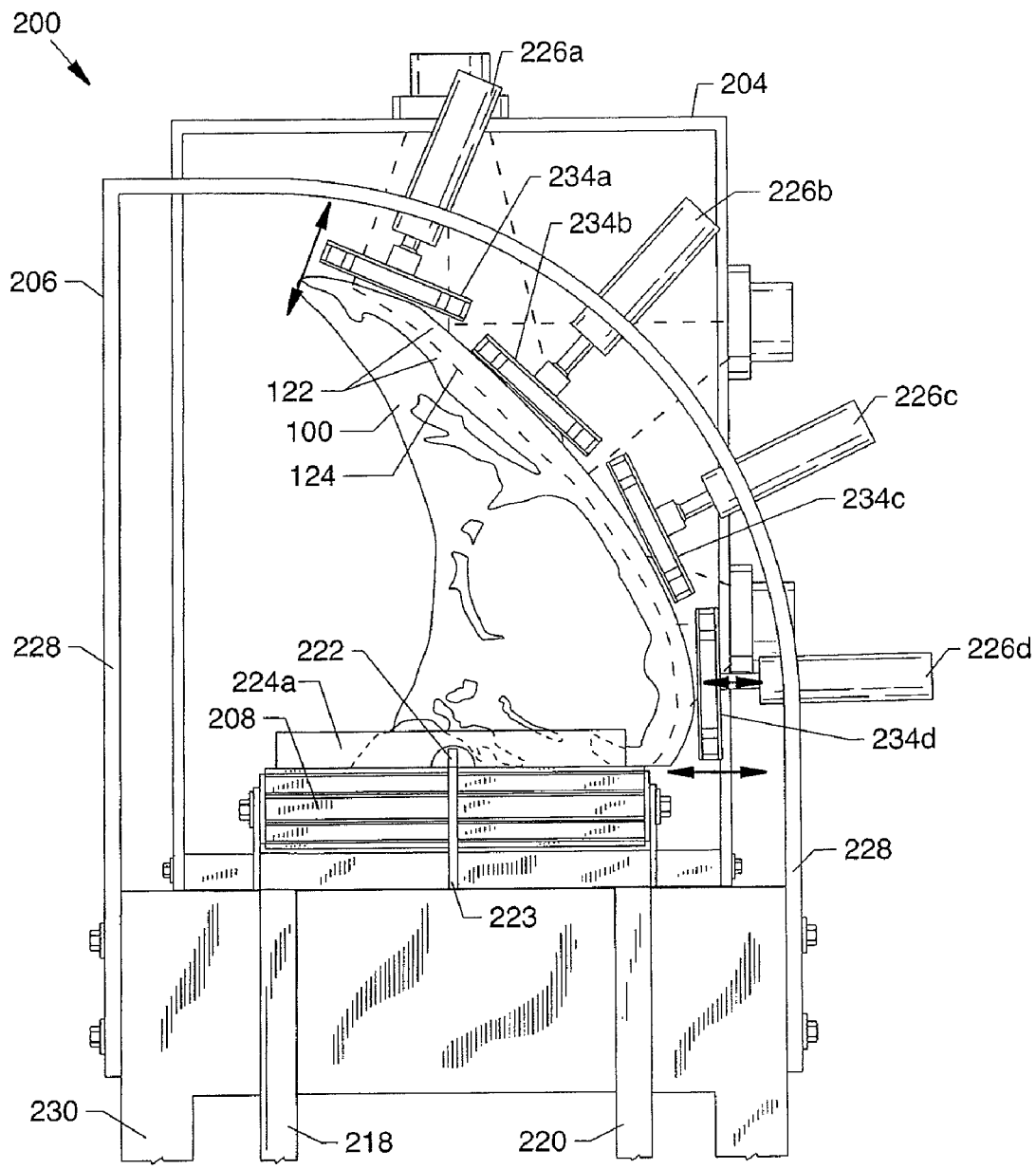
FIG. 5 is an end view of the automated fat trimming system to better illustrate the trimming assembly.

FIG. 5 is an end view of system 200 (taken from second end 212) and includes imaging system 204 and trimming assembly 206. FIG. 5 shows a position of trim knives 226 prior to system 200 initiating contact between trim knives 226 and cut 100. As described above in FIG. 4, with the inclusion of pivot assemblies 242 and 244, it is possible to change the angle of blade assemblies 234 relative to meat cut 100. Based on the known contours of cut 100, adjustments are made to knives 226 such that each of knives 226 has proper orientation to cut 100. It is recognized that the accuracy of the contours of cut 100 depends, in part, on the sophistication of imaging system 204. Similarly, the sophistication of trim knives 226 impacts the precision, in part, to which the angle of blade assemblies 234 may be adjusted. As described further below, in some embodiments, an automated fat trimming system similar to system 200 may be used without an imaging system.

Figure 6:
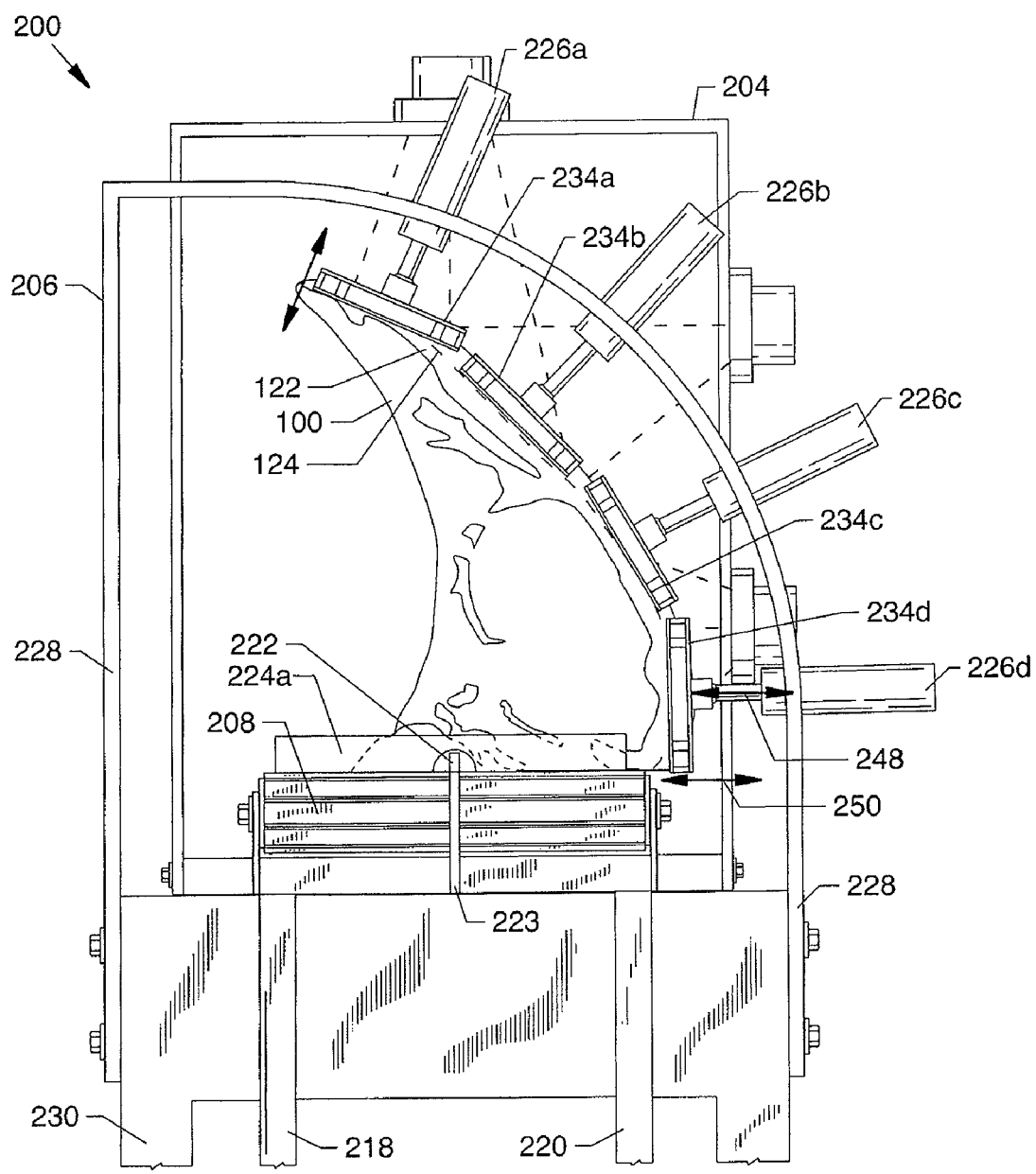
FIG. 6 is an end view, similar to FIG. 5, showing the trimming assembly in operation to remove fat from the short loin.

FIG. 6 is similar to FIG. 5, but shows a position of trim knives 226 engaging an outer surface of cut 100. More specifically, knives 226 are contacting outer fat 122 of cut 100 and removing a portion of the fat from the surface. Dashed line 124 represents location of outer fat layer 122 after the predetermined amount of fat is removed by knives 226. In some embodiments, support frame 228 and support table 230 are fixed or stationary and as described above, actuators 236 may be adjusted in order to properly orient knives 226 relative to cut 100. (This is represented by arrow 248 of FIG. 6.) Adjustments may need to be made based, in part, on an overall size of cut 100, an original thickness of outer fat 122, and the desired final thickness of outer fat 122.

Prior to operation of knives 226 to remove fat from the meat cut, knives 226 are typically configured such that actuators 236a and 236b are in the same position relative to one another (for example, both actuators are in a fully retracted position). As shown in FIG. 3, each of knives 226 is essentially parallel with cut 100. During the trimming process when knives are contacting cut 100, in some embodiments, the amount of retraction by each of knife actuators 236a and 236b may be different. As such, knife blade 234 is at an angle relative to cut 100, with blade assembly 234 angled downward toward cut 100. As described immediately above, adjustments are made to knives 226 to control an orientation of knives 226 to cut 100. However, in some embodiments, support table 230 may be adjusted in order to bring knives 226 closer or farther relative to cut 100. (This is represented by arrow 250 of FIG. 6.)

Figure 8:
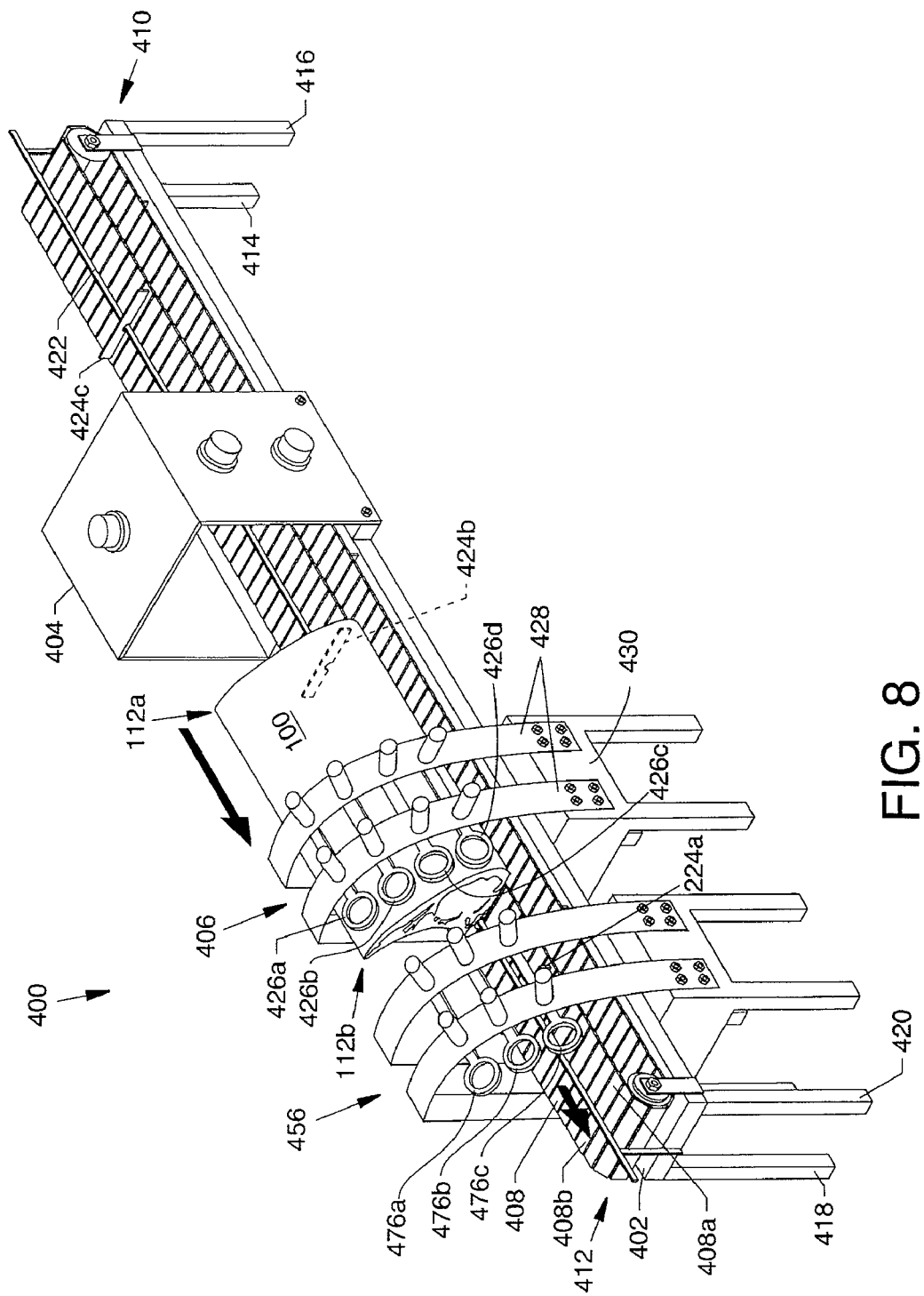
FIG. 8 is a perspective view of an alternative embodiment of an automated fat trimming system that is similar to FIG. 3, but includes a second trimming assembly.

It is recognized that FIGS. 4-6 represent one embodiment of trimming assembly 206, which includes a particular design of trim knife 226. Other designs of trim knife 226 may be used in system 200 to remove fat from different cuts of meat. In the embodiment shown in FIG. 3, trimming assembly 206 includes four knives 226. It is recognized that more or less knives may be used and the number of knives chosen may depend, in part, on an average size of the meat cuts undergoing trimming using system 200 and/or an average amount of fat intended to be trimmed from the meat cuts. In an alternative embodiment, an automated meat trimming system, like system 200, may include a second trimming assembly located downstream of trimming assembly 206. The first and second trimming assemblies would thus be arranged in series. This alternative embodiment is shown in FIG. 8 and described below.

System 200 and the alternative embodiments below are described herein as automated fat trimming systems. These automated fat trimming systems are designed such that essentially all or a majority of the predetermined excess fat from outer fat layer 122 is removed with minimal or no operator intervention during normal operation of the system. However, it is recognized that even though system 200 and the alternative embodiments are configured to be fully automated, system 200 includes the option for operator control and override. For example, adjustments to trimming assembly 206 may routinely be made by a control system (see FIG. 7). Alternatively, adjustments may be made through operator intervention, or a combination of automated adjustments and operator driven adjustments.

In some embodiments, imaging system 204 may not always be used during operation of system 200. In some embodiments, the imaging system may be excluded from the automated fat trimming system. Instead of the contours of the meat cut being based on data collected by the imaging system, an operator may, for example, adjust the knives based on the operator's knowledge of the fat profile. In some cases the operator may keep the knives under the same operating conditions for a plurality of cuts being processed through the fat trimming system. Alternatively, the operator may adjust the knives for each cut of meat. It is recognized that an operator may adjust the knives directly or through a processing device that controls actuation of the knives (see FIG. 7 and the description below).

After passing through trimming assembly 206, cut 100 may undergo some hand trimming. The extent of the hand trimming may depend, in part, on the starting thickness of outer fat 122 and the uniformity or lack thereof of fat 122 on cut 100. Moreover, the precision and accuracy with which system 200 removes outer fat 122 also depends in part on the sophistication of imaging system 204 and trimming assembly 206. Even if some hand trimming is beneficial or required (based on the specifications for the final meat product), system 200 and the alternative embodiments below make it possible to eliminate the majority of the manual labor that goes into trimming fat 122.

Figure 7:
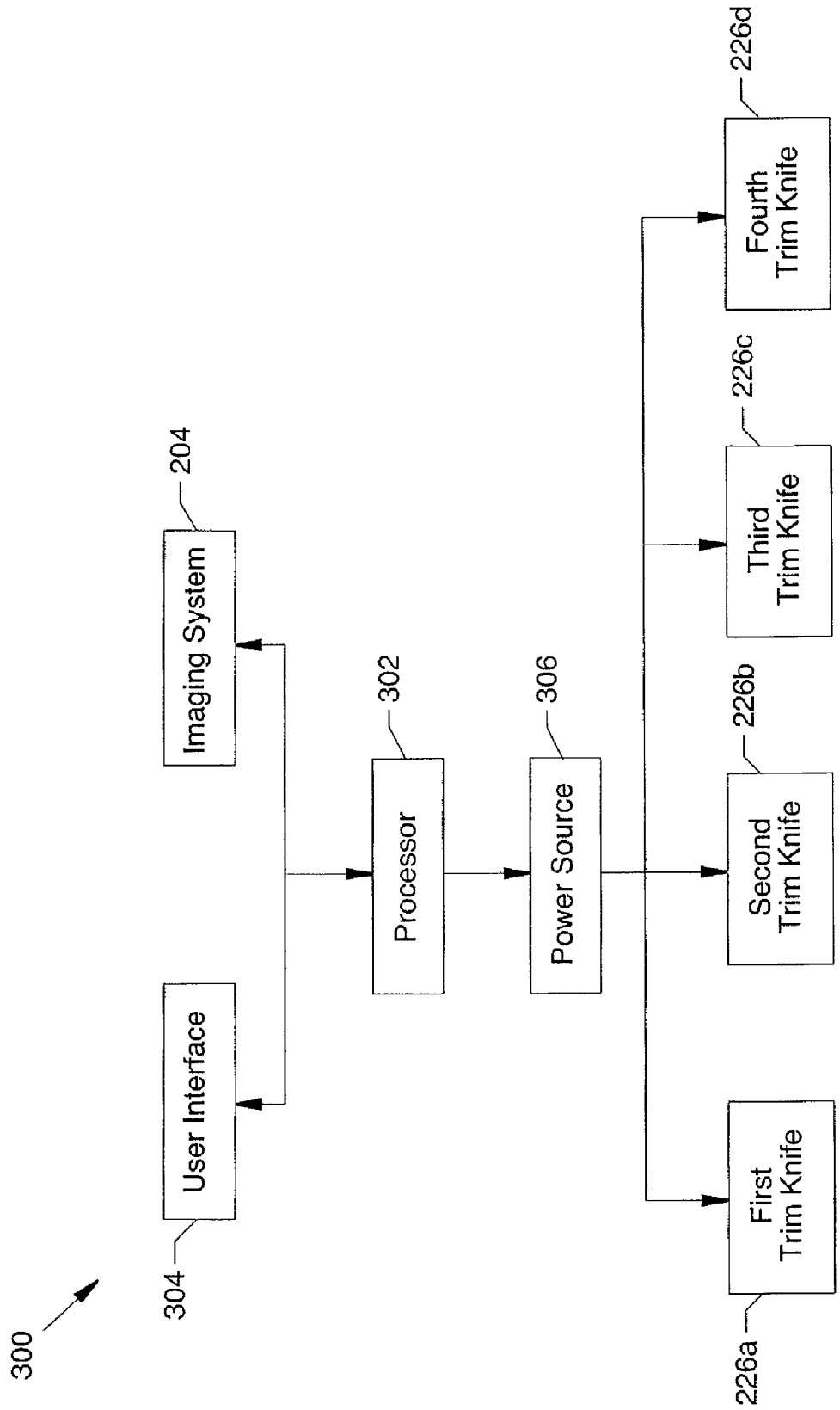
FIG. 7 is a process flow diagram for operation of the fat trimming system of FIG. 3.

FIG. 7 is a process flow diagram to illustrate use of control system 300 for operating automated fat trimming system 200 of FIG. 3. Control system 300 includes processor 302, user interface 304, imaging system 204 of FIG. 3, power source 306, first trim knife 226a, second trim knife 226b, third trim knife 226c, and fourth trim knife 226d of FIG. 3. Imaging system 204 creates at least one image of meat cut 100, in which the images are focused on outer fat 122. Imaging system 204 then relays the image data to processor 302, which may be a computer or other processing device. Processor 302 analyzes the data and creates a fat profile for the outer surface of meat cut 100. The detail or resolution of the fat profile depends, in part, on the type of technology used for imaging system 204. Processor 302 then communicates with power source 306, which actuates trim knives 226, which includes first trim knife 226a, second trim knife 226b, third trim knife 226c and fourth trim knife 226d. Through power source 306, processor 302 makes adjustments to knives 226.

As mentioned above, in some embodiments of the automated fat trimming system, an imaging system may not be included or used. In those embodiments, a processor may still be used to control operation of knives 226. Information about the fat profile of a cut of meat may be known or ascertained and then input into the processor by an operator. As stated above, a processor would then adjust the trimming knives based on the information received about the fat profile and the desired end thickness.

Control system 300 may be configured such that each knife may be individually adjusted, independent of the other knives; alternatively, knives 226 may be adjusted collectively and to the same degree. For example, all of knives 226 would be moved inward in a direction closer to the meat cut. In the embodiment of FIG. 7, individual adjustments may be made to knives 226, allowing for tighter control on how fat is removed from the meat cut. The adjustments to the knives relate to how much fat to remove and where to remove it from, as described above in reference to FIGS. 4-6 Processor 302 may also control operating parameters for knives 226, for example, a rotary speed of the annular blade.

In some embodiments, control system 300 may perform other functions in addition to controlling the position, orientation, and operation of trim knives 226. Examples of additional functions by control system 300 may include, but are not limited to, starting and stopping system 200 and changing a speed of conveyor 208. Moreover, control system 300 may control operation of imaging assembly 204.

As shown in FIG. 7, control system 300 includes control of trim knives 226, and knives 226 are configured to be fully automated during normal operation. It is recognized, however, that trim knives 226 may be manually adjusted as necessary or as desired. Similarly, at some points during operation, operator intervention may be used on other areas of system 200.

FIG. 8 is a perspective view of automated fat trimming system 400, which is an alternative embodiment of system 200. The components of system 400 are essentially the same as system 200, with the addition in system 400 of second trimming assembly 456, which includes knives 476a, 476b, and 476c. Second trimming assembly 456 includes the same support elements as trimming assembly 406; and knives 476 are configured essentially the same as knives 226 of FIGS. 3 and 4. First and second trimming assemblies 406 and 456 are arranged in series. As meat cut 100 travels toward second end 412 of conveyor 408, cut 100 undergoes trimming by both first and second trimming assemblies 406 and 456. In the embodiment shown in FIG. 8, second trimming assembly 456 includes three trim knives 476, which are offset from knives 426. As such, knives 426 may remove fat from an area of cut 100 that may not be easily reached by knives 426.

In other embodiments, second trimming assembly 456 could include knives aligned with knives 426. In that case, the knives of second trimming assembly 456 would contact essentially the same area of cut 100 as knives 426. Using that type of design, the first set of knives could remove a predetermined amount of fat and the second set of knives could remove an additional predetermined amount of fat. Depending on the design, in some embodiments, the knives may be limited as to how much of fat 122 they are able to remove in a single pass. By having more than one trimming assembly in series, a significant amount of fat may be removed from a meat cut, without having to process the meat cut through the automated system more than once.

It is recognized that second trimming assembly 456 may include more or less than three knives. In other embodiments, more than two trimming assemblies may be used in series in an automated fat trimming system.

Figure 9:
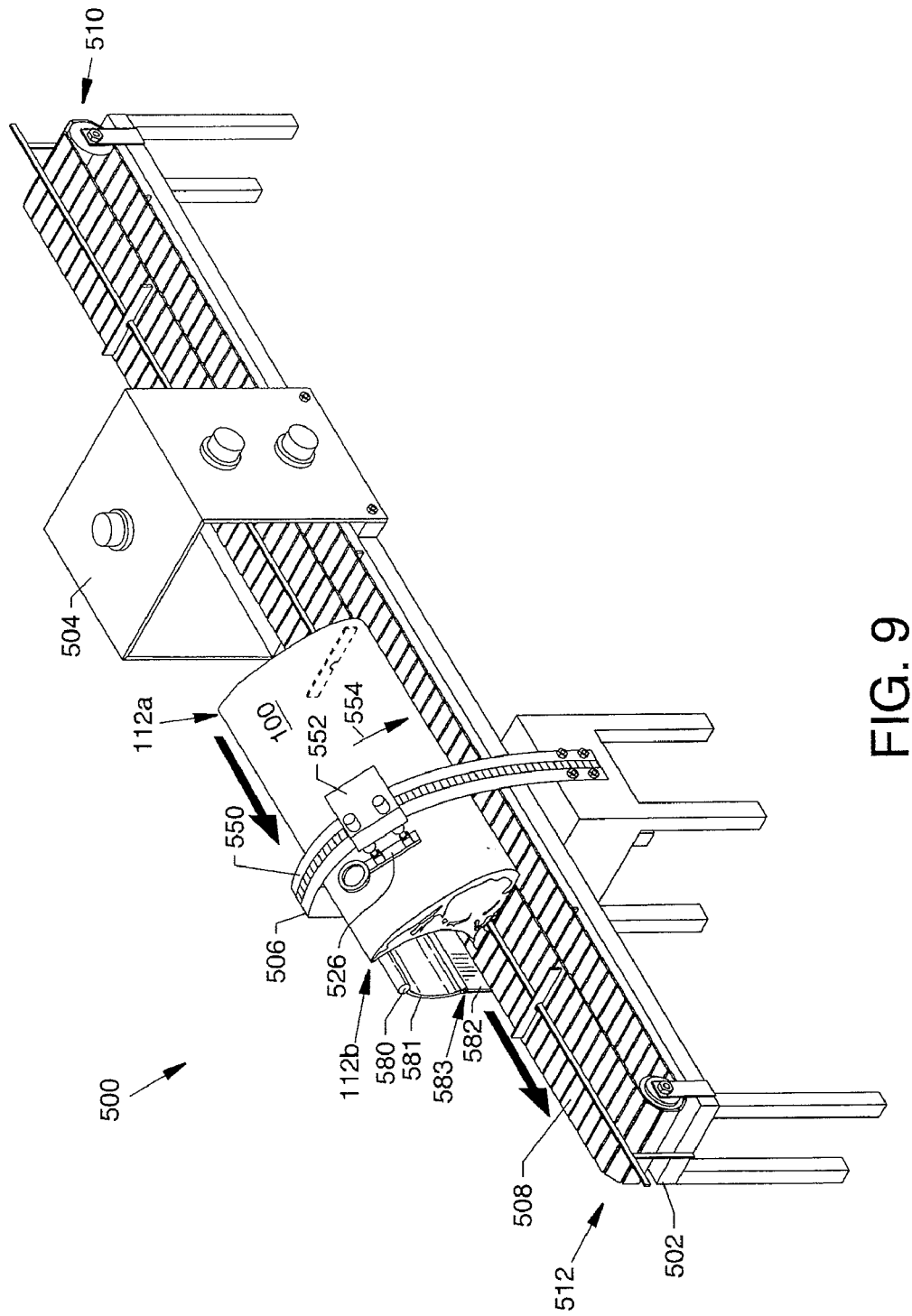
FIG. 9 is a perspective view of yet another alternative embodiment of an automated fat trimming system.

FIG. 9 is a perspective view of automated fat trimming system 500, which is an alternative embodiment of systems 200 and 400. The components of system 500 are essentially the same as system 200, with the exception that trimming assembly 506 has a different configuration compared to assembly 206. In the embodiment shown in FIG. 9, trimming assembly 506 is oriented such that trim knife 526 operates in a vertical orientation as compared to the horizontal orientation of trim knives 526 in FIG. 3. Thus trim knife 526 removes fat in a direction perpendicular to a direction of movement of conveyor 508. Trimming assembly 506 includes track 550, car 552, and trim knife 526. In one embodiment, as meat cut 100 travels from first end 510 of conveyor 508 to second end 512, conveyor 508 stops or significantly slows down. As such, cut 100 is essentially stationary as trimming assembly 506 is used to trim fat from the outer surface of cut 100. During trimming of cut 100, car 552 is configured to move on track 550 in the direction indicated by arrow 554. Knife 526 is attached to car 552 and thus follows the same motion as car 552. As such, knife 526 removes fat from cut 100 starting at top 100a of cut 100 and moving to bottom 100b.

Figure 10:
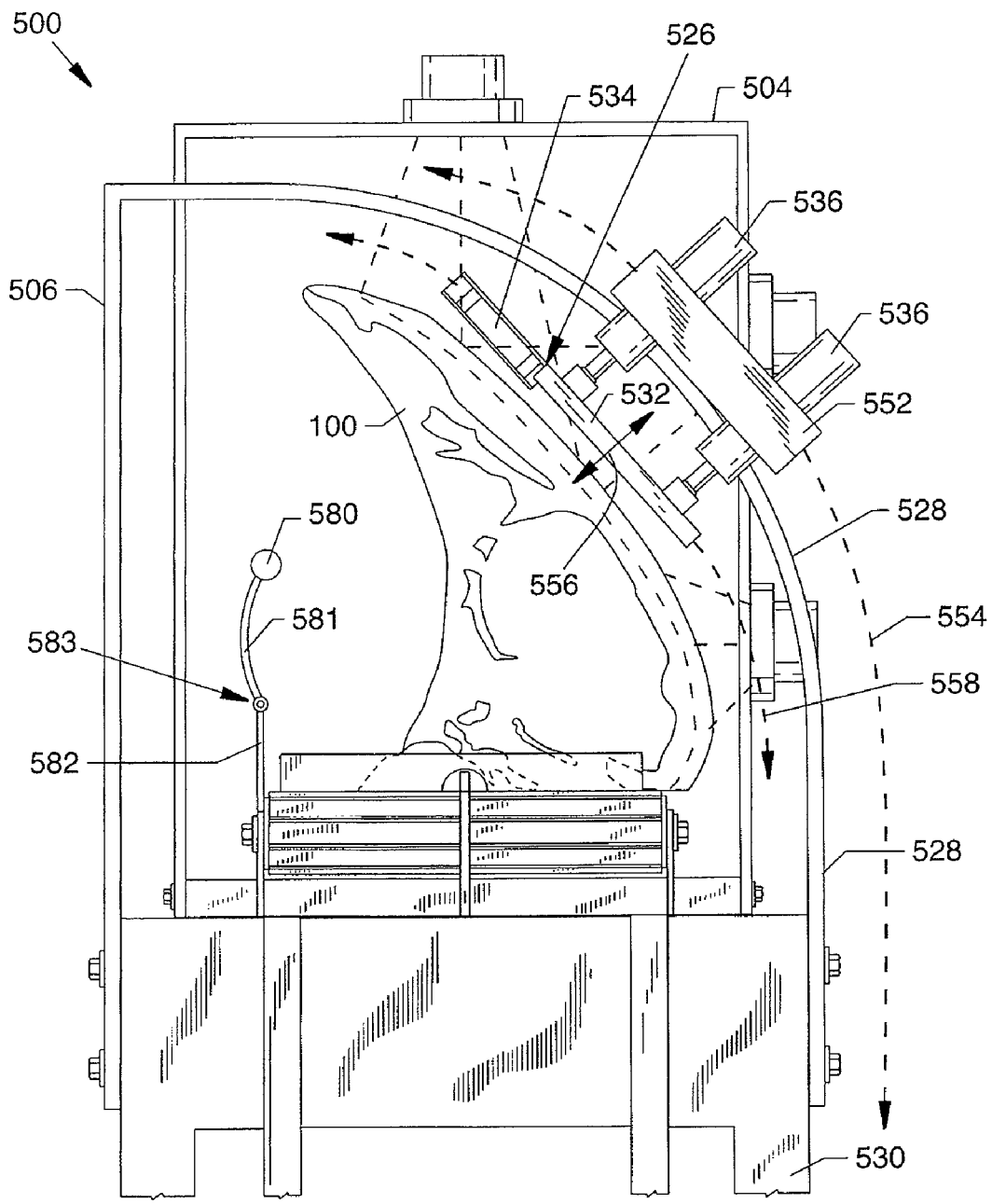
FIG. 10 is an end view of the system of FIG. 9 to better illustrate the trimming assembly of FIG. 9.
Figure 11:
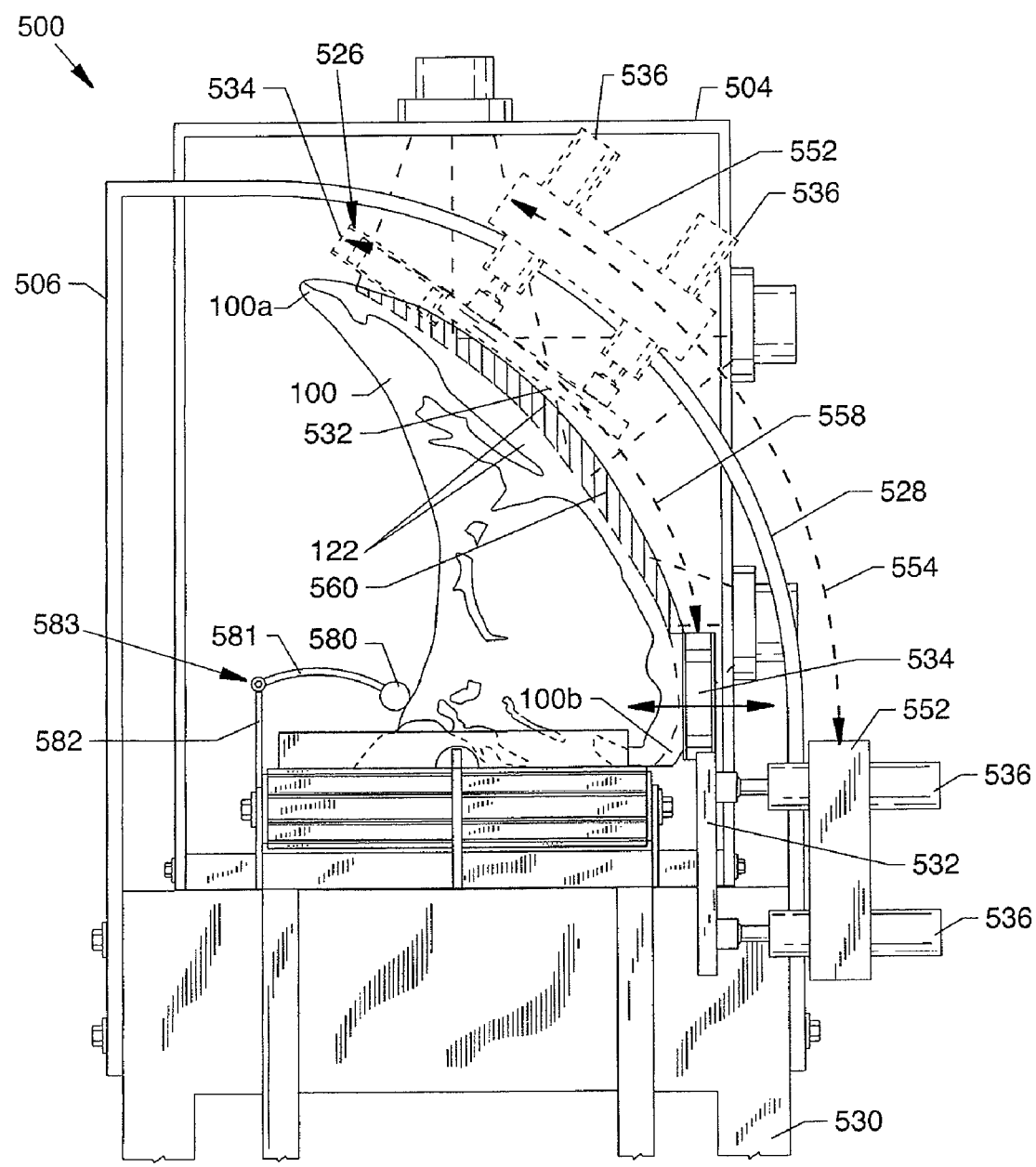
FIG. 11 is an end view, similar to FIG. 10, showing the trimming assembly in operation.

System 500 optionally includes support bar 580 which runs along a portion of conveyor 508. As shown in FIG. 9, support bar 580 may be attached to work surface 502 by attachment 582. Support bar 580 may be used to contact and exert pressure on an underside of cut 100. By pressing down on the underside of cut 100, support bar 580 stabilizes cut 100 in a direction generally perpendicular to the direction of movement of conveyor 508, thus preventing cut 100 from tipping back in a direction toward trim knife 526 and car 552. In some embodiments and as shown in FIGS. 9-11, support bar 580 may be an articulating bar such that bar 580 is in engagement with cut 100 when cut 100 is undergoing trimming and then bar 580 may return to a relaxed position (i.e. no contact with cut 100) as cut 100 resumes travel on conveyor 508. Connector 581 is used to connect support bar 580 to attachment 582, which includes hinge 583. As better illustrated in FIGS. 10 and 11 below, hinge 583 is used to move connector 581 and support bar 580 between a relaxed position (FIG. 10) and an engaged position (FIG. 11). It is recognized that other designs of a meat support device may be used to contact and stabilize cut 100 in a direction perpendicular to a direction of movement of conveyor 508. For example, a drive system similar to a caterpillar-style drive may be used to contact the underside of the cut and apply pressure using a pressurized belt.

FIG. 10 is an end view of system 500 to better illustrate trimming assembly 506 prior to activation of knife 526 for trimming cut 100. Knife 526 is similarly configured to knife 226 of FIG. 4 and includes knife actuators 536, knife body 532, and blade assembly 534. Actuators 536 may be operated similar to actuators 236, and thus may be used to bring knife body 532 and blade assembly 534 closer to or further from cut 100 (as indicated by arrow 556). Table 530 may also be moved in order to bring knife body 532 and blade 534 closer to or further from cut 100. Arrow 558 shows movement of knife 526 as car 552 moves in the direction indicated by arrow 554. Support bar 580 is shown in FIG. 10 as not having contact with cut 100 since knives 526 are not in operation.

FIG. 11 shows trimming assembly 506 once trim knives 526 are engaged with meat cut 100 through actuation of knife actuators 536. The dashed lines in FIG. 11 show car 552 and knife 526 (which includes actuators 536, knife body 532 and blade assembly 534) at top 100*a* of cut 100 at a beginning of the trimming process for a first section on cut 100. The solid lines for car 552 and knife 526 represent the position of car 552 and knife 526 at the end of the trimming process for the first section on cut 100. As stated above, car 552 moves on track 550 in a direction from top 100*a* of cut 100 to bottom 100*b*. Blade 534 engages with the outer surface to remove a portion of fat 122. Shaded area 560 in FIG. 11 represents the fat removed by blade 534 as car 522 and knife 526 move from top 100*a* of cut 100 to bottom 100*b*. In FIG. 11, support bar 580 is shown in engagement with cut 100. More specifically, support bar 580 contacts the underside of cut 100 in an area on or near the chine bone to prevent movement of cut 100.

As described above in reference to FIGS. 4-6, it may be beneficial for blade assembly 534 to have some freedom of movement relative to trim knife body 532 such that blade assembly 534 can follow the contours on the exterior of cut 100. In some embodiments, an angle of knife 526 relative to cut 100 may change as knife 526 moves on track 550. The angle may be continuously adjusted by a control system based on information gathered by imaging system 504.

In the embodiment shown in FIG. 9, automated system 500 only includes one trimming assembly 506 with a single knife. As mentioned above, conveyor 508 could be slowed down or stopped as cut 100 undergoes trimming. Once knife 526 has reached bottom 100*b* of cut 100 (as shown in FIG. 11), knife 526 may be returned to a starting position (top 100*a* of cut 100) by moving car 552 on track 550. Conveyor 508 may then advance cut 100 towards second end 512, at which point trimming assembly 506 may remove fat from a second section of cut 100 closer to sirloin end 112*a*. In other embodiments, multiple knives may be used. (See FIG. 12 and the description below.)

Controlling operation of fat trimming system 500 may be similar to what is shown in FIG. 7 for fat trimming system 200. A processor may communicate with imaging system 504 to gather images of cut 100. Those images are then used by the processor to create a fat profile of cut 100. A power source is then used to control operation of knife 526 and car 552. Control may include, for example, the speed at which car 552 moves on track 550. Control of knife 526 may include the angle of knife 526 relative to the cut of meat. Depending on the precision of knife 526, in some embodiments, the angle of knife 526 may change as car 552 moves on track 550.

Figure 12:
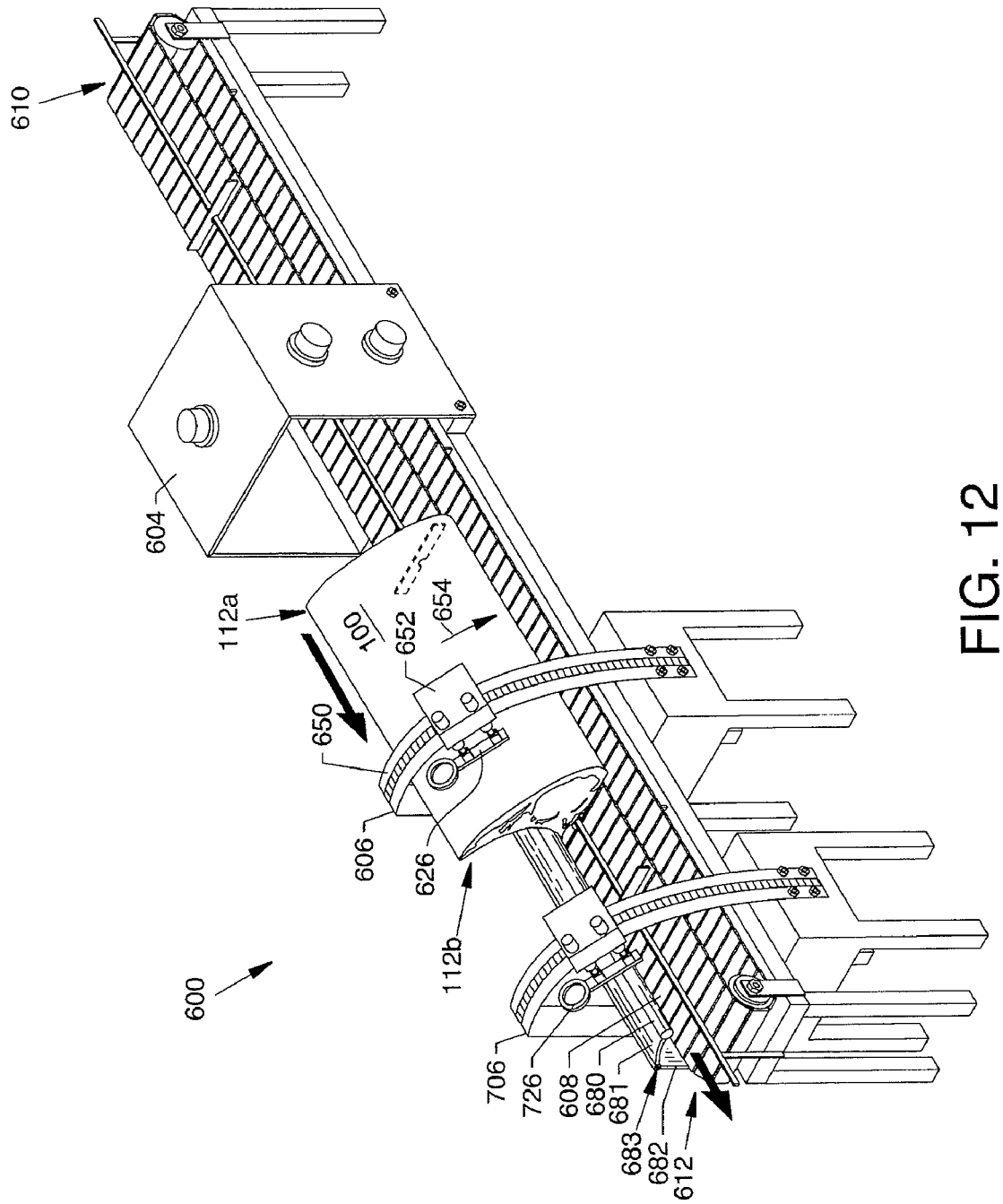
FIG. 12 is a perspective view of an alternative embodiment of an automated fat trimming system similar to FIG. 9, but having a second trimming assembly.

FIG. 12 is yet another alternative embodiment of an automated fat trimming system, which is similar to system 500 of FIG. 9. Automated fat trimming system 600 includes essentially the same components as system 500, with the addition of second trimming assembly 706, which is configured similarly to trimming assembly 606. Knife 726 of second trimming assembly 706 has its own car and track and thus moves independently of knife 626. A control system similar to control system 300 described above may be used to control operation of system 600, including operation of trimming assemblies 606 and 706. Knives 626 and 726 may be controlled in such a way that they are operating at the same conditions (for example, the speed of the car on the track, the angle of the knife relative to meat cut 100, etc.). Alternatively, knives 626 and 726 may be operating at different conditions and independent of one another. The control system of FIG. 7, as described for operation of system 200, may similarly be used for operation of system 600.

As described above, conveyor 508 may be slowed down or stopped in order for trimming assembly 606 to remove fat from cut 100 using knife 626. For a system like FIG. 12 having more than one trimming assembly in a vertical orientation, it may be possible for each trimming assembly to remove fat from a different section of cut 100. In that way a larger area of fat may be removed with each stop of conveyor 508. Alternatively, second trimming assembly 706 may be used to remove additional fat from an area on cut 100 already trimmed by first trimming assembly 606.

System 600 optionally includes support bar 680, which is similar to support bar 580 described above in reference to system 500 of FIGS. 9-11. Support bar 680 is shown in the engaged position in FIG. 12 and is used to put pressure on the underside of cut 100 when cut 100 undergoes trimming by trimming assembly 606 and/or second trimming assembly 706. As shown in FIG. 12, support bar 680 is configured to span both trimming assembly 606 and second trimming assembly 706. In other embodiments, two different support bars may be used—a first support bar for trimming assembly 606 and a second support bar for trimming assembly 706. As such, each of the support bars is able to articulate or move from a relaxed to an engaged position independently of the other support bar. This configuration would most likely be used if trimming assembly 606 and second trimming assembly 706 were operating independent of each other and/or configured to trim different cuts of meat at the same time. Although the support bar is only shown in FIGS. 9-12 and in reference to systems 500 and 600, it is recognized that a similar support bar may be used in the other embodiments described herein for the automated fat trimming system, such as systems 200 and 400 of FIGS. 3 and 8.

In the embodiments for an automated fat trimming system shown in the figures above, a single cut of meat is shown being processed through the automated fat trimming system. However, it is recognized that more than one cut of meat may be processed at the same time. For example, referring back to FIG. 3, cut 100 may be undergoing trimming at the same time that a second cut of meat (not shown) may be passing through imaging assembly 204 in order to determine the fat profile on the second cut of meat. In the embodiments shown above for an automated fat trimming system, the trimming knives are shown to have an annular rotary blade. This is just one example of the type of knife or trimming device that may be used for the automated fat trimming system described herein. Other configurations for the trimming device include, but are not limited to, a cheese wire (which may rotate to chip away fat), a water jet or a fixed knife blade. In some embodiments, the trimming assembly may use heat that is applied to the trimming device, and more specifically to the blade, to make it easier for the trimming device to slice through the fat on the meat cut.

In the embodiments for an automated fat trimming system shown in the figures above, the conveyor or other type of advancement device moves the cut of meat from one end of the automated system to the other end. The meat cut is generally fixed or stationary on the conveyor. As described above, the knives of the trimming assembly are adjusted based on the contours of the cut undergoing processing, and the knives are configured to move relative to the meat cut. In some embodiments, the knives of the trimming assembly may be essentially stationary, and the cut of meat may move relative to the knives. For example, a robotic arm or robotic device may be used to grip the cut of meat and move the meat around the knives so that the knives are able to trim the appropriate amount of fat from the outer surface of the meat while remaining stationary or fixed. In some embodiments, the robotic arm or device may be configured to rotate the cut of meat 360 degrees. As described above, a processor may be used to determine the direction and degree of movement of the robotic arm or device. The path of movement by the robotic arm or device will depend, in part, on the fat profile of the cut, the number of knives being used for trimming, and the capability of each knife. In some embodiments, the knives may be oriented in parallel to one another such that more than one knife may be trimming fat from the cut at the same time. In other embodiments, the knives may be arranged in series such that the cut of meat may move relative to a first knife and then the cut of meat may be advanced within the automated system such that the cut of meat moves relative to a second knife. A combination of knives in parallel and knives in series may also be used.

The automated system and method described herein for trimming fat from an outer surface of a primal of meat is well designed to be used in conjunction with an automated system for removing the chine bone. Referring back to FIG. 3, meat cut 100 may move directly from second end 212 of system 100 to an automated chine separation system (as described in PCT/US2006/038645). The chine separation system may be contained within the same process line as the automated fat trimming system described herein. Alternatively, the meat cut may be moved to a separate process line containing the chine separation system, after processing through the fat trimming system. Both the fat trimming system and the chine separation system use the spinal groove on a bone-in cut of meat to orient the meat as it travels on the conveyor or other feature used to move the meat cut.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of removing fat from an outer surface of a primal of meat using an automated system, the method comprising: directing the primal of meat from a first end of a conveyor of the automated system to a second end of the conveyor; determining where to remove fat from the outer surface; and removing the determined fat from the outer surface of the primal of meat using an automated trimming assembly, further comprising: securing the primal of meat on the conveyor of the automated system, wherein securing the primal of meat on the conveyor is performed by a protrusion that runs a length of the conveyor and engages with a spinal groove on the primal of meat.

2. A method of removing fat from an outer surface of a primal of meat using an automated system, the method comprising: directing the primal of meat from a first end of a conveyor of the automated system to a second end of the conveyor; determining where to remove fat from the outer surface; and removing the determined fat from the outer surface of the primal of meat using an automated trimming assembly, wherein the automated trimming assembly includes an annular rotary blade.

3. The method of claim 2 wherein the automated trimming assembly includes at least two annular rotary blades arranged in parallel to each other.

4. A method of removing fat from an outer surface of a primal of meat using an automated system, the method comprising: directing the primal of meat from a first end of a conveyor of the automated system to a second end of the conveyor; determining where to remove fat from the outer surface; and removing the determined fat from the outer surface of the primal of meat using an automated trimming assembly, wherein the automated trimming assembly includes at least two trimming devices arranged in series along the conveyor.

5. A method of removing fat from an outer surface of a primal of meat using an automated system, the method comprising: directing the primal of meat from a first end of a conveyor of the automated system to a second end of the conveyor; determining where to remove fat from the outer surface; and removing the determined fat from the outer surface of the primal of meat using an automated trimming assembly, wherein removing the determined fat from the outer surface of the primal of meat includes removing fat in a direction perpendicular to movement of the conveyor.

6. The method of claim 5 wherein the automated trimming assembly includes a knife and a car configured to move in a direction perpendicular to movement of the conveyor.

7. A method of removing fat from an outer surface of a primal of meat using an automated system, the method comprising: directing the primal of meat from a first end of a conveyor of the automated system to a second end of the conveyor; determining where to remove fat from the outer surface; and removing the determined fat from the outer surface of the primal of meat using an automated trimming assembly, wherein the automated trimming assembly includes at least one trimming device and the automated system further comprises a robotic device configured to move the primal of meat relative to the at least one trimming device.

8. A method of removing fat from an outer surface of a loin using an automated trimming assembly, the method comprising: positioning the loin at a first end of an automated system; moving the loin towards a second end of the automated system; determining an amount of fat to be removed from the outer surface of the loin; adjusting at least one operating setting of the automated trimming assembly as a function of the determined amount of fat; and removing the determined amount of fat from the outer surface of the loin using the automated trimming assembly.

9. The method of claim 8 wherein determining the amount of fat to be removed from the outer surface includes using an imaging system to gather at least one image of the loin.

10. The method of claim 8 wherein the automated trimming assembly includes a knife and the at least one operating setting includes an angle of the knife relative to the loin.

11. The method of claim 8 wherein the automated trimming assembly includes at least one set of knives arranged in series.

12. An automated system for trimming fat from an outer surface of a loin, the automated system comprising: a conveyor configured to move the loin from a first end of the system to a second end of the system; an orientation device configured to align the loin on the conveyor; a trimming assembly configured to trim fat from the outer surface of the loin; an imaging assembly configured to create at least one image of the loin; a processor that receives the at least one image of the loin in order to determine a fat profile on the outer surface of the loin, wherein the processor is configured to adjust the trimming assembly as a function of the fat profile.

13. The automated system of claim 12 wherein the trimming assembly includes at least one knife.

14. The automated system of claim 13 wherein the at least one knife trims fat in a direction parallel to a direction of movement of the conveyor.

15. The automated system of claim 13 wherein the at least one knife trims fat in a direction perpendicular to a direction of movement of the conveyor.

16. The automated system of claim 15 wherein the at least one knife is attached to a car and the car resides on a track that facilitate movement of the car in a direction perpendicular to movement of the conveyor.

17. The automated system of claim 13 wherein the at least one knife is attached to a knife body that controls movement of the knife relative to the loin, and the at least one knife has freedom of movement relative to the knife body.

18. The automated system of claim 13 wherein heat is applied to the at least one knife.

19. The automatic system of claim 13 further comprising a robotic device configured to move the loin relative to the at least one knife.

20. The automated system of claim 12 wherein the orientation device is a protrusion oriented in parallel with a direction of movement of the conveyor and configured to align with a spinal groove on the loin.

21. The automated system of claim 12 further comprising: a backstop configured to contact a trailing edge of the loin and prevent the loin from traveling in a direction opposite to a direction of movement of the conveyor.

22. The automated system of claim 12 further comprising: a support bar configured to contact an underside of the loin and prevent the loin from moving in a direction generically perpendicular to a direction of movement of the conveyor.

23. The automated system of claim 12 wherein the imaging assembly includes at least one of X-ray, infrared, camera, video, machine vision, ultrasound, MRI, laser-imaging, thermo-graphic imaging, computerized tomography (CT), and a combination thereof.

* * * * *